Feb. 3, 1942.　　F. H. KAYLER　　2,271,839
CAR COUPLER
Filed Nov. 1, 1940　　5 Sheets-Sheet 1
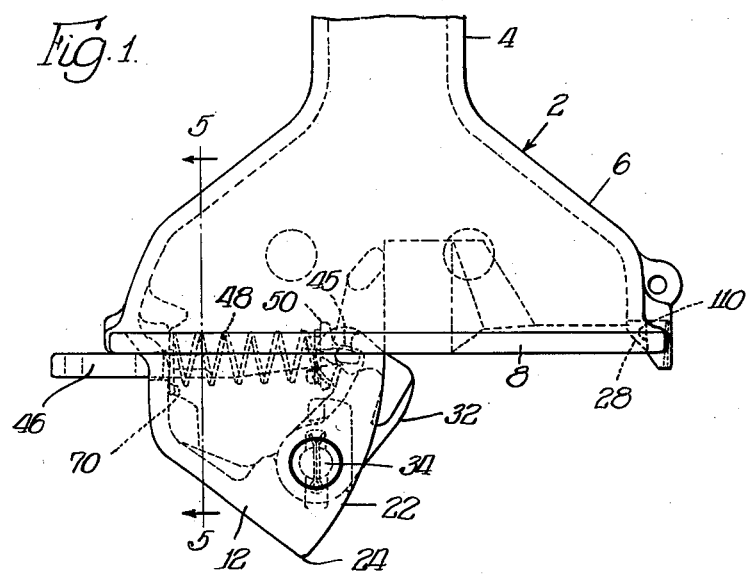
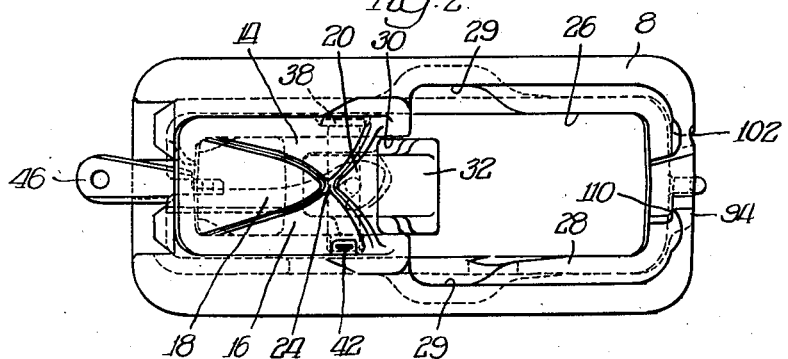
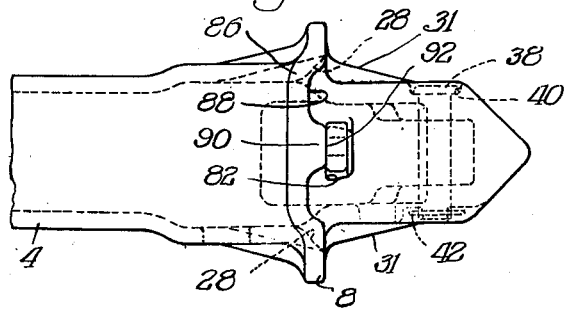
INVENTOR.
Frank H. Kayler,
BY
atty.

Feb. 3, 1942.                F. H. KAYLER                2,271,839
                              CAR COUPLER
                         Filed Nov. 1, 1940            5 Sheets-Sheet 2
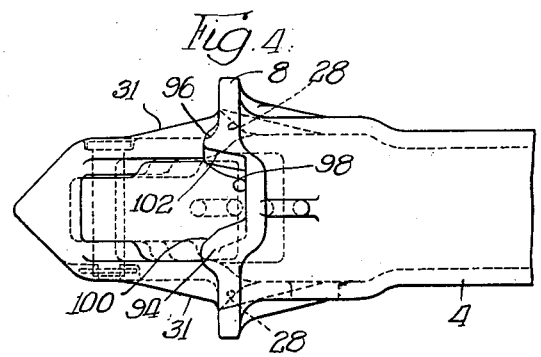
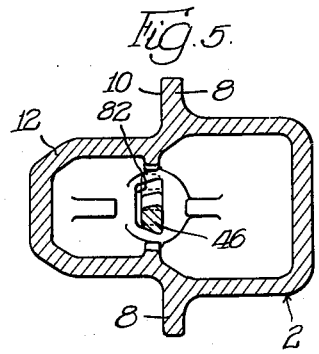
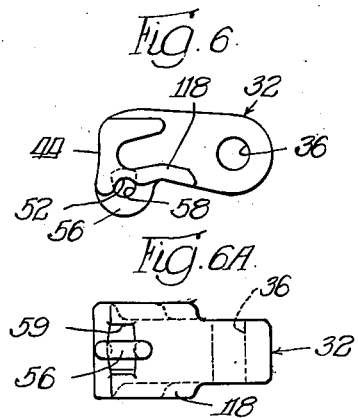
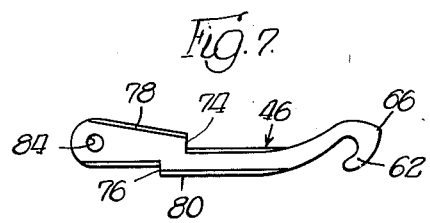
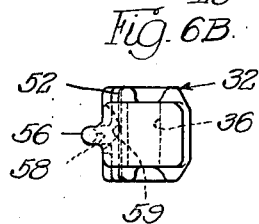
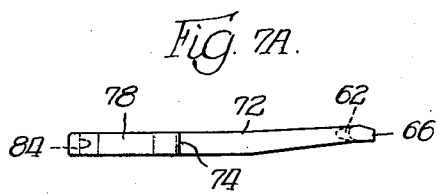
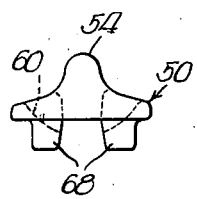
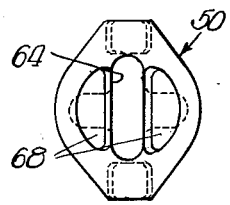
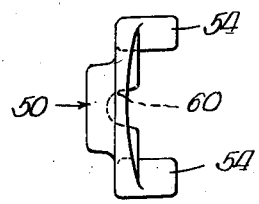
INVENTOR.
Frank H. Kayler,
BY
          att'y Feb. 3, 1942.   F. H. KAYLER   2,271,839
CAR COUPLER
Filed Nov. 1, 1940   5 Sheets-Sheet 3

INVENTOR.
Frank H. Kayler,
BY
ATTY.

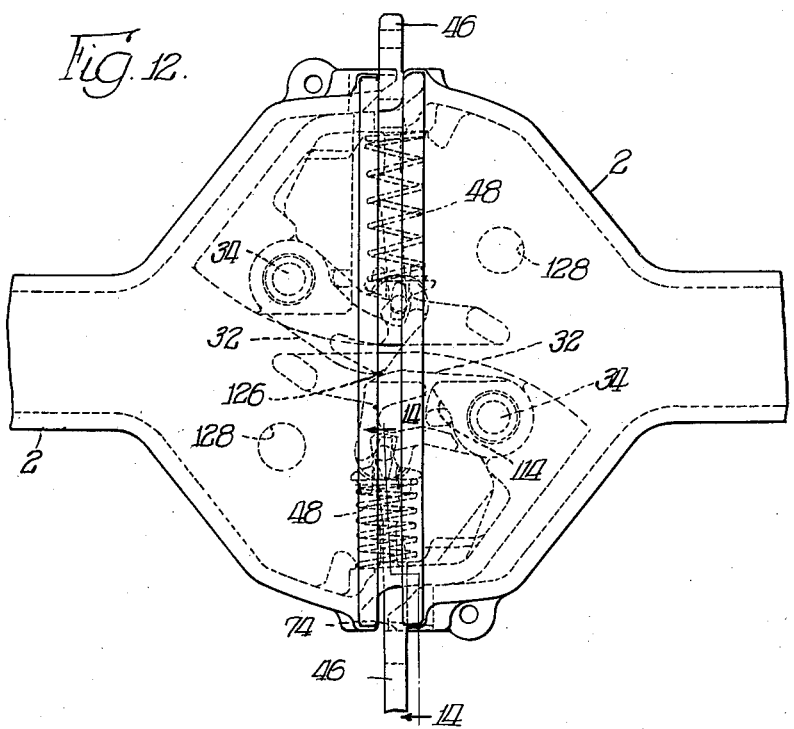
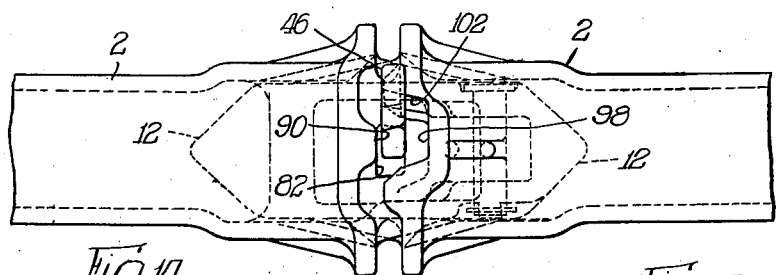
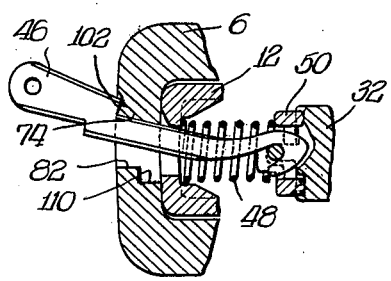

Feb. 3, 1942.      F. H. KAYLER      2,271,839
CAR COUPLER
Filed Nov. 1, 1940      5 Sheets-Sheet 5
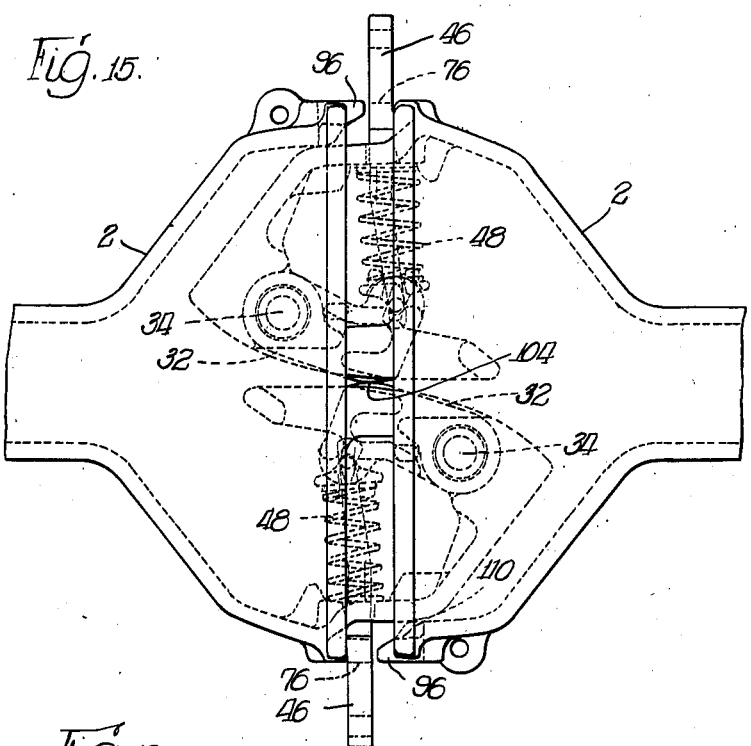
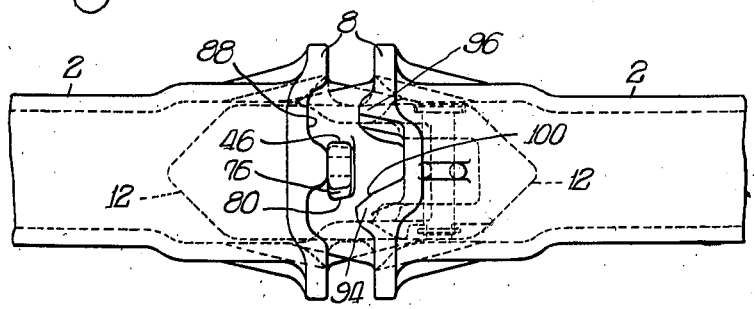
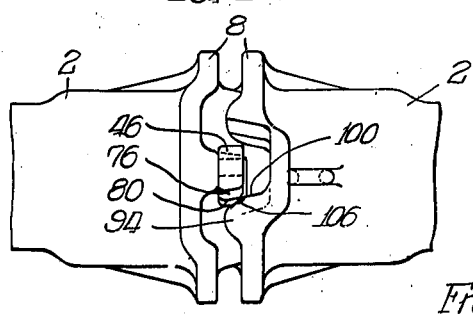

Patented Feb. 3, 1942

2,271,839

UNITED STATES PATENT OFFICE 2,271,839

CAR COUPLER

Frank H. Kayler, Alliance, Ohio, assignor to American Steel Foundries, Chicago, Ill., a corporation of New Jersey Application November 1, 1940, Serial No. 363,823

23 Claims. (Cl. 213—104)

My invention relates to car couplers, and more particularly to an automatic tight lock car coupler especially suitable for use on mine or industrial cars.

My invention comprehends an improvement of a car coupler which is described in a co-pending application, Serial No. 300,307, filed in the name of Edmund P. Kinne, and is generally similar to it in form. In the latter coupler anti-creep means and a lock set are afforded for the lock operative in said coupler. In my invention the lock in one coupler is afforded a lock set and a lock to the lock operative by engagement of the operating arm with the mating coupler.

A general object of my invention is to devise a tight lock nonarticulating coupler wherein slack is reduced to a minimum and wherein the operating parts are afforded protection from dirt and other extraneous matter.

An object of my invention is to devise a tight lock coupler wherein an automatic lock to the lock or anti-creep means for the lock on one coupler is afforded on the mating coupler.

My invention comprehends a car coupler having anti-creep means which becomes operative automatically upon coupling with a mating coupler and is automatically releasable upon separation of mating couplers.

Another object of my invention is to devise a tight lock car coupler wherein a lockset for the lock therein is afforded on the mating coupler and wherein said lockset is automatically releasable upon separation of mating couplers.

A specific object of my invention is to devise a tight lock car coupler having a lock pivoted in a tapered nose and an operating arm connected to said lock and extending through a wall of said coupler for engagement with cam means on one side of a mating coupler, said cam means being operative to lift the operating arm to a position where it will cooperate with the mating coupler to afford a lock to the lock.

In the drawings, Figure 1 is a top plan view of a coupler embodying my invention.

Figure 2 is a front view of the coupler head shown in Figure 1.

Figure 3 is a side view of the coupler head shown in Figure 1, the view being taken from the left thereof.

Figure 4 is a side view of the coupler shown in Figure 1, the view being taken from the right thereof.

Figure 5 is a sectional view taken through the coupler shown in Figure 1, the section being taken substantially in the vertical plane indicated by the line 5—5 of Figure 1.

Figure 6 is a plan view of a lock used in the coupler head shown in Figure 1. Figure 6A is a side elevation of said lock, and Figure 6B is an end view thereof.

Figure 7 is a side view of an operating arm used in the coupler structure shown in Figure 1, and Figure 7A is a top view of said arm.

Figure 8 is a front view of a spring socket used in my novel coupler. Figure 8A is a top view thereof, and Figure 8B is a side view thereof.

Figure 12 is a top plan view of mating couplers embodying my invention showing their relative positions at the beginning of the uncoupling operation from lockset position.

Figure 13 is a side view of the couplers shown in Figure 12.

Figure 14 is a fragmentary sectional view showing an operating arm in lockset position, the section being taken substantially in the vertical generally transverse planes indicated by the lines 14—14 of Figure 12.

Figure 15 is a top plan view of mating coupler heads embodying my invention showing the position of the locks when passing each other during a coupling or uncoupling operation.

Figure 16 is a side view of the mating coupler heads shown in Figure 15.

Figure 17 is a fragmentary sectional view of mating couplers, the section being taken substantially in the vertical plane indicated by the line 17—17 of Figure 10.

Figure 18 is a fragmentary side elevation of mating coupler heads showing the relative positions of the couplers and an operating arm during the coupling operation.

Figure 9:
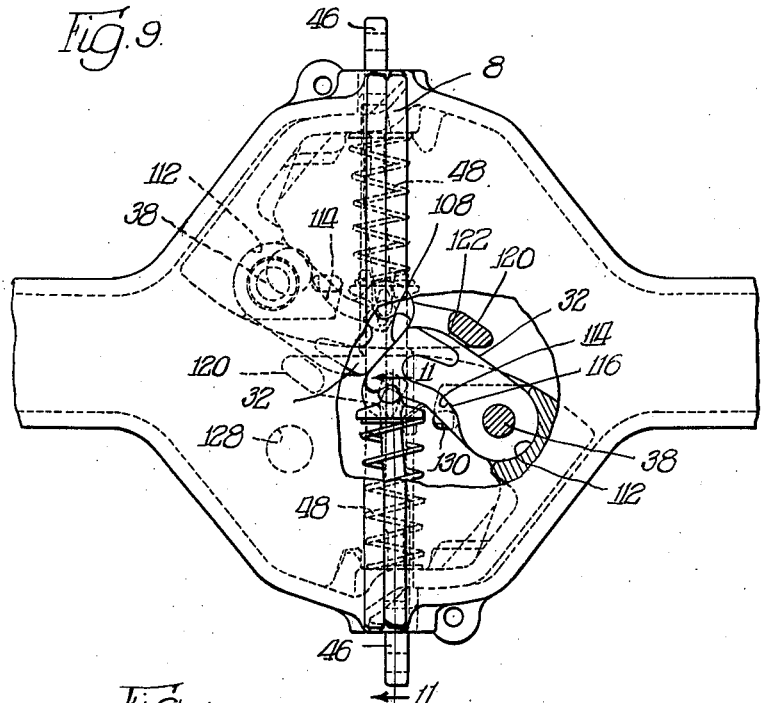
Figure 9 is a top plan view of mating coupler heads embodying my novel invention in normal coupled position, a fragment of the top walls of said couplers being broken away to show more clearly the locking arrangement of said couplers.

In detail, the coupler head generally indicated at 2 comprises a fragmentarily shown shank 4 of any suitable structure, and a hollow funnel-shaped housing 6 having a generally rectangular box-like form as viewed from Figure 2. Around the forward extremity of said housing may be formed a generally vertical flange 8 interrupted at opposite sides of said housing as hereinafter more fully described.

The front faces 10, 10 on said peripheral flange 8 afford abutment for complementary faces on a peripheral flange of a mating coupler for taking buffing forces during operation. Projecting outwardly from approximately one-half of the forward extremity of said housing may be a tapered or pyramidal nose 12 having its base integrally formed with said housing adjacent to flange 8. The nose 12 is generally hollow and includes flat tapered top and bottom walls 14 and 16, a flat tapered side wall 18 and a tapered side wall 20 having a generally arcuate form as indicted at 22, all of said walls converging to a common point 24. At the other half of the front of said housing and adjacent to said nose may be a rectangular opening 26 accommodating a nose on a mating coupler and said opening 26 may be afforded beveled or inclined surfaces 28, 28 around its marginal edges for cooperation with the tapered nose of the mating coupler. Adjacent the vertical longitudinal center line of said housing and on the top and bottom walls thereof may be formed tapered grooves 29, 29 for engagement with complementary tapered lugs 31, 31 on top and bottom walls 14 and 16 of the nose on a mating coupler.

Adjacent to the base of the nose 12 may be an opening 30 in the wall 20 through which may project a portion of a lock 32 which is housed within said nose and which is afforded a pivotal connection 34 adjacent to its forward end. The lock 32 is shown in detail in Figures 6, 6A, and 6B and comprises a solid block of metal having at one end a pin hole 36 through which a pivot pin 38 may extend to afford the pivotal connection 34. The head of pin 38 may be recessed as at 40 in the top wall 14 of said nose and said pin may be securely retained at its opposite end by the cotter pin 42 seated in the bottom wall 16 of said nose. A locking face 44 of generally ogee configuration may be afforded at the end of said lock opposite the pivot pin hole 36. Adjacent to said locking face may be connected as at 45 an operating arm 46 having a compression spring 48 sleeved over said arm and afforded a seat on a spring socket 50 associated with said lock. The lock 32 may be afforded vertically spaced recesses 52, 52 for reception of spaced lugs 54, 54 formed on one side of the spring socket 50. Intermediate the spaced recesses 52, 52 a bridge 56 defines an eye 58, and inwardly of said eye may be formed a recess or notch 59. The bridge 56 is accommodated in a transverse groove 60 on the spring socket intermediate the lugs 54, 54 for preventing vertical displacement of said socket. The hook-like end 62 of the operating arm 46 may be inserted through the vertical slot 64 in the spring socket 50 and the eye 58 on the lock 32 for connecting the operating arm and the socket 50 to the lock 32. It may be noted that the notch 59 has its deepest portion offset upwardly from the bridge 56. The hook-like end 62 of the operating arm may be generally complementary in form to the notch 59, said end 62 being afforded excess metal at its extremity as at 66 to permit its insertion through said eye 58 in only one position so that correct assemblage of the lock and operating arm is assured. At opposite sides of slot 64 on the spring socket, spaced bosses 68, 68 afford positioning means for the spring 48 seated thereon. The opposite end of the spring 48 may be afforded a seat as at 70 against the inner surface of the wall 18 on the nose 12.

The operating arm 46 (Figures 7 and 7A) may be slightly laterally bent as at 72 and is afforded, in addition to the hook-like end 62, a shoulder 74 on its upper edge and a shoulder 76 on its lower edge spaced from the shoulder 74. The top and bottom edges of said arm may be slightly inclined as at 78 and 80 respectively for facilitating cooperation with means on a mating coupler head as hereinafter described. The operating arm 46 extends outwardly through a vertical opening 82 in side wall 18 of the nose 12 and is afforded at its outer end a hole 84 for engagement with any convenient coupler operating means. At the side of the housing adjacent to the operating arm 46, the peripheral flange 8 may be offset as at 86, 86 to form spaced recesses 88, 88 with a lug 90 therebetween afforded abutment as at 92 with a side of the operating arm 46. At the opposite side of said housing the peripheral flange 8 is afforded vertically spaced outwardly projecting members 94 and 96 for reception within the spaced recesses 88, 88 on a mating coupler, and said members 94 and 96 define therebetween a recess 98 accommodating the operating arm 46 and the lug 90 on a mating coupler. The projection 94 has a cam or sloping surface 100 which may pass underneath the operating arm 46 on a mating coupler for engagement with the inclined surface 80 on the lower edge of the operating arm. The projection 96 has an inclined shallow groove 102 cooperating with the operating arm 46 of a mating coupler to afford a lockset. The purpose and function of the outwardly projecting members 94 and 96 may be best understood from a consideration of mating coupler heads in coupled position and during their coupling and uncoupling.

In coupling, mating coupler heads are guided into alignment by the tapered noses and the beveled edges around the openings 26, 26 which afford a maximum vertical and lateral coupling gathering range as fully described and illustrated in said co-pending application. As each nose 12 moves into the accommodating opening 26 on the mating coupler, each lock 32, which normally projects outward from said nose slightly beyond the center line of the coupler, slidingly engages the lock on the mating coupler as may be best seen at 104 in Figure 15. Figures 15, 16 and 18 show mating coupler heads in positions just before the completion of the coupling operation and it may be noted from a consideration thereof that each lock 32 is rotated inwardly about the pivotal connection 34 by said sliding engagement with the lock on the mating coupler. The inward movement of each lock 32 compresses each spring 48 between the lock 32 and the side wall 18 of each coupler, and each operating arm 46 is urged outwardly through the slot 82 in the side wall 18 of the nose. The shoulder 76 on the lower edge of the operating arm 46 is thus placed approximately in line with the outer face of the projection 94 on the mating coupler as is best seen in Figure 15. As the couplers continue to move together the cam surface 100 on the projection 94 engages the inclined lower edge 80 of the operating arm 46 on the mating coupler as at 106 (Figure 18) and passes underneath said operating arm and lifts it so that it will not become jammed between the mating coupler heads. When the locks have passed each other they are rotated outwardly by the compression springs 48, 48 into locking engagement as at 108 in Figure 9, and the operating arm is carried inwardly by its connection to said lock so that the shoulder 76 drops into the recess 110 formed on the inner side of the projection 94 on the mating coupler.

In normal coupled position the locks 32, 32 are held in tight abutment by the compression springs 48, 48. In case of failure of said compression springs each lock is prevented from disengagement with the lock of the mating coupler by the abutment of the shoulder 76 on the operating arm 46 with the wall 124 defining the recess 110 on the mating coupler. It is thus apparent that I have afforded a lock to the lock or anti-creep means on each coupler which is operative for the operating arm 46 for the lock associated with the mating coupler.

Figure 10:
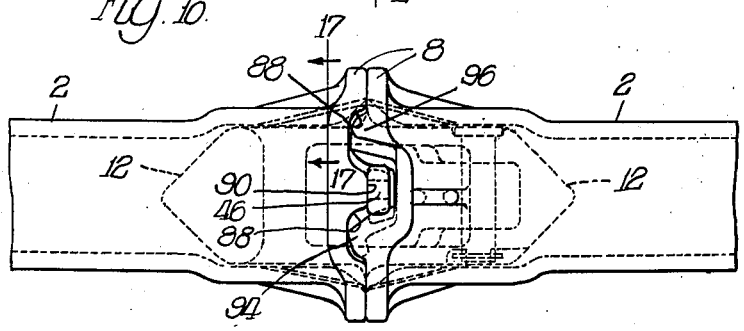
Figure 10 is a side elevation of the mating couplers shown in Figure 9.
Figure 11:
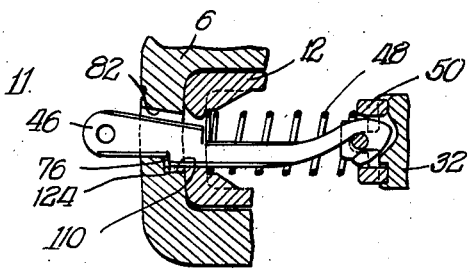
Figure 11 is a fragmentary sectional view showing the position of an operating arm when mating couplers are in normal coupled position, the section being taken substantially in the vertical transverse plane indicated by the line 11—11 of Figure 9.

The positions of the parts of each coupler in normal coupled position may be best seen from a consideration of Figures 9, 10 and 11 wherein it may be noted that the flanges 8, 8 on mating couplers are in tight abutment and the locking faces 44, 44 on the locks 32, 32 are in tight abutment at 108. The ogee configuration of the locking faces enables the locks to move into locked position with a minimum of clearance or slack therebetween. Under pull the locks afford a solid column under compression and each pivot pin 38 is substantially relieved from shearing stresses by seating the adjacent end of each lock against the nose 12 as at 112. In normal coupled and uncoupled position each lock 32 has outward movement limited by stop means in the form of a lug 114 projecting upwardly from the bottom wall of the nose for abutment as at 116 with the flange 118 on the lock 32. Additional stop means limiting outward movement of each lock 32 in coupled position may be afforded by an upstanding lug 120 formed on the bottom wall of the mating coupler, and said lug 120 may have engagement with the lock 32 at 122 in case of wear of stop means 114.

In uncoupling, the operating arm 46 of only one of the couplers may be disengaged from its anti-creep position and may be pulled upwardly and outwardly so that the shoulder 74 on the upper edge of the operating arm 46 is seated in the inclined notch 102 formed on the projection 96 of the mating coupler to afford a lockset. This is best seen in Figures 12, 13 and 14 wherein the lock of the left coupler which is in lockset position is shown retracted into the hollow nose with the spring 48 placed under further compression and wherein the lock and operating arm of the right coupler remain at anti-creep or lock to the lock position. It may be noted in Figure 12, which shows the coupler heads after slight separation, that slight clearance at 126 is afforded between the adjacent cam-like or rounded edges of the lockset lock and the locked lock. During further separation the lockset position of the lock of the left coupler is maintained until the shoulder 74 slides out of engagement with the notch 102 on the right coupler and the lock is rotated outwardly by the compressed spring 48 so that its rounded edges will be in engagement with the corresponding rounded edges of the lock of the right coupler. Approximately simultaneously with the release of the lockset of the left coupler, the anti-creep or lock to the lock of the right coupler is automatically released by the shoulder 76 slipping out of engagement with the recess 110 on the left coupler. This is readily apparent because the projecting members 94 and 96 extend outwardly from each coupler head for about the same distance. The positions of the locks of the mating couplers just after release of the lockset and anti-creep are best seen in Figure 15 wherein it may be noted that the locks have sliding engagement at 104 and each lock may yield to the other because the operating arms are now out of engagement with the respective projections 94 and 96 on the mating couplers. The locks are thus free to pass each other and to return to their normal position upon completion of uncoupling. Each is then ready for another coupling operation. It will be understood, of course, that either lock may be placed in lockset position while the other lock is left at anti-creep position in order to effect an uncoupling.

In coupled position it is clear that the tight abutment of the housings of mating couplers substantially prevents the entry of dirt and extraneous matter into the housings, however a hole 128 and an opening 130 are afforded in the bottom wall of each coupler and nose respectively to permit drainage and escape of extraneous matter or dirt which may lodge in the coupler housing when the couplers are in uncoupled position.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In an automatic coupler comprising a hollow head of funnel form presenting a tapering nose, an opening laterally thereof for reception of a mating nose, a lock pivoted in said nose and normally projecting into said opening for engagement with the lock of the mating coupler, an operating arm pivoted to said lock, a spring surrounding said arm and operable to retain said lock in normal position, said operating arm being movable to rotate said lock, and lockset means comprising a shoulder on said arm cooperating with a projecting member on the mating coupler.

2. In a car coupling, mating coupler heads, each comprising a housing presenting at the forward end thereof, projecting means and an opening receiving the projecting means of the mating coupler, locks pivoted in said projecting means and extending into said openings for abutment with each other to retain said couplers in normal locked position, lock operating means, and anti-creep means comprising a member on each coupler slidable into and out of engagement with the lock operating means on the mating coupler.

3. In an automatic tight lock vehicle coupling, mating coupler heads each comprising a housing with a tapering nose and an opening for reception of the nose of the mating coupler, locks pivoted adjacent forward ends of each coupler nose and having ogee locking faces engaging each other for abutment as pulling stresses are applied to said couplers, operating arms for said locks, and anti-creep means for said locks including members on said heads affording abutment for means on the operating arm of the mating coupler.

4. In an automatic car coupling, mating coupler heads each comprising a housing with a flange extending therearound at one extremity thereof, a tapered nose projecting outward from said flange adjacent one side of said housing, and an opening at the other side of said housing for reception of the nose of the mating coupler, a lock within said nose, lock operating means, and means on said flange engaging the lock operating means of the mating coupler to afford an anti-creep for the lock of the mating coupler.

5. In an automatic tight lock coupler, a coupler head presenting a pyramidal nose and an opening for accommodating the nose of a mating coupler, a lock pivoted in said nose, an operating arm connected to said lock, and projecting members at one side of said head for cooperating with means on the operating arm of the mating coupler to afford an anti-creep and a lockset respectively.

6. In an automatic tight lock coupler, a coupler head presenting a pyramidal nose and an opening for accommodating the nose of a mating coupler, a lock pivoted in said nose, an operating arm connected to said lock, and a member on one side of said head cooperating with means on the operating arm of the mating coupler to afford an anti-creep for the lock of the mating coupler.

7. In a tight lock car coupling, mating coupler heads each presenting a movable lock for abutment with the lock of a mating coupler, operating means for said locks, and anti-creep means automatically operative when said couplers are coupled and one of said anti-creep means being automatically releasable as said couplers are uncoupled, said anti-creep means including a member on one coupler affording abutment for means on the lock operating means of the other coupler.

8. In an automatic car coupling, mating coupler heads each presenting a movable lock for abutment with the lock of a mating coupler, operating arms for said locks, and anti-creep means automatically operative as said couplers are coupled, said means including a cam member on each coupler movable into engagement with the operating arm on the mating coupler during coupling and affording an abutment for means on each said operating arm.

9. In a tight lock car coupling, mating coupler heads each presenting a movable lock for abutment with the lock of a mating coupler, operating means for said locks, and anti-creep means automatically operative when said couplers are coupled and one of said anti-creep means being automatically releasable as said couplers are uncoupled, said anti-creep means comprising a member on each coupler slidable into and out of engagement with the lock operating means on the mating coupler.

10. In a tight lock car coupling, mating coupler heads each presenting a pivoted lock for abutment with the lock of a mating coupler, operating means for said locks, and anti-creep means automatically operative when said couplers are coupled and one of said anti-creep means being automatically releasable as said couplers are uncoupled, said means comprising a member on one coupler movable into and out of engagement with means on the lock operating means of the other coupler.

11. In an automatic tight lock coupler, a coupler head presenting a tapered nose and an opening for reception of the nose of a mating coupler, a peripheral flange around said head at the forward extremity thereof, a lock pivoted in said nose, an operating arm for said lock, and projecting means on said flange cooperating with the operating arm of the mating coupler to afford a lock for the lock of the mating coupler.

12. In an automatic tight lock coupler, a coupler head presenting a tapered nose and an opening for reception of the nose of a mating coupler, a peripheral flange around said head at the forward extremity thereof, a lock pivoted in said nose, an operating arm for said lock, and spaced members on said flange adapted to cooperate with means on the mating coupler for affording anti-creep and lockset means for the lock of the mating coupler.

13. In an automatic tight lock coupler, a coupler head presenting a tapered nose and an opening for reception of the nose of a mating coupler, a peripheral flange around said head at the forward extremity thereof, a lock pivoted in said nose, an operating arm for said lock, a spring compressed between said lock and said wall, anti-creep means comprising a shoulder on said arm cooperating with a member on the mating coupler.

14. In an automatic car coupling, mating coupler heads each presenting a movable lock for abutment with the lock of a mating coupler, operating arms for said locks, springs associated with said locks, and anti-creep means automatically operative as said couplers are coupled, said means including a cam member on each coupler cooperating with the operating arm on the mating coupler.

15. In an automatic car coupling, mating coupler heads each presenting a movable lock for abutment with the lock of a mating coupler, operating arms for said locks, and anti-creep means automatically operative as said couplers are coupled, said means including a projecting lug at one side of each coupler adapted for engagement with the operating arm on the mating coupler.

16. In an automatic tight lock car coupling, mating coupler heads each presenting a pivoted lock for engagement with the lock of a mating coupler, operating means for said locks, and lockset means including a shoulder on the lock operating means of each coupler slidable out of engagement with a projecting member on the mating coupler as said couplers uncouple.

17. In an automatic tight lock car coupling, mating coupler heads each presenting a lock for engagement with the lock of a mating coupler, operating means for said locks, and lockset means for each lock including means on the lock operating means of one coupler adapted for engagement with projecting means on the other coupler.

18. In a tight lock car coupling, mating coupler heads each presenting a movable lock for abutment with the lock of a mating coupler, operating means for said locks, and anti-creep means for each of said locks comprising a projecting member on each coupler affording abutment for the lock operating means on the mating coupler.

19. In a tight lock car coupling, mating coupler heads each presenting a lock for abutment with the lock of a mating coupler, operating means for said locks, and anti-creep means for each of said locks comprising a member on one side of each coupler adapted for engagement with the lock operating means on the mating coupler.

20. In a car coupling, mating coupler heads each presenting a pivoted lock for abutment with the lock of a mating coupler, lock operating means, and anti-creep means for each lock including a member on each coupler adapted to cooperate with the lock operating means on the mating coupler.

21. In a car coupling, mating couplers each presenting a pivoted lock for abutment with the lock of the mating coupler, operating means for said locks, and means for moving each operating means into a position affording an anti-creep for the associated lock, said means including a cam member on each coupler adapted to engage the operating means of the mating coupler.

22. In a car coupling, mating coupler heads each presenting a movable lock for engagement with the lock of the mating coupler, operating members for said locks, and automatically releasable lockset means for each coupler, said lockset means including means on each operating member adapted to disengage with means on the mating coupler as the couplers separate in uncoupling.

23. In an automatic tight lock coupler, a coupler head presenting a pyramidal nose and an opening for accommodating the nose of a mating coupler, a lock pivoted in said nose, an operating arm connected to said lock, means at one side of said head for cooperating with means on the operating arm of the mating coupler to afford an anti-creep and lockset respectively, and a cam surface on the means affording the anti-creep.

FRANK H. KAYLER.